United States Patent [19]

Vermilye

[11] Patent Number: 4,697,763
[45] Date of Patent: Oct. 6, 1987

[54] HINGE SYSTEM FOR THRUST REVERSER COWL

[75] Inventor: Michael L. Vermilye, Redmond, Wash.

[73] Assignee: The Boeing Company, Seattle, Wash.

[21] Appl. No.: 793,571

[22] Filed: Oct. 31, 1985

[51] Int. Cl.$^4$ .............................................. B64C 1/14
[52] U.S. Cl. .................................. 244/129.4; 244/54
[58] Field of Search .................. 244/53 R, 54, 129.5, 244/110 B, 129.4; 16/356, 360, 364; 292/256–267; 49/383; 114/201 R, 202

[56] References Cited

U.S. PATENT DOCUMENTS

| | | | |
|---|---|---|---|
| 1,461,158 | 7/1923 | Parke | 49/383 |
| 2,623,713 | 12/1952 | Foster | 244/54 |
| 2,663,517 | 12/1953 | Price | 244/54 |
| 2,783,003 | 2/1957 | Ralston et al. | 244/54 |
| 2,800,346 | 7/1957 | Manning | 244/129.4 |
| 2,944,766 | 1/1960 | Freeding et al. | 244/54 |
| 3,113,353 | 12/1963 | Tucknott | 244/129.5 |
| 3,347,578 | 10/1967 | Sheehan et al. | 244/54 |
| 3,541,794 | 11/1970 | Johnston et al. | 60/226.2 |
| 3,568,446 | 3/1971 | Mullins et al. | 60/226.2 |
| 3,791,073 | 2/1974 | Baker | 244/129.5 |
| 4,037,809 | 7/1977 | Legrand | 244/54 |
| 4,044,973 | 8/1977 | Moorehead | 244/54 |
| 4,130,260 | 12/1978 | Poe | 244/129.5 |
| 4,150,802 | 4/1979 | Evelyn et al. | 244/54 |
| 4,365,775 | 12/1982 | Glancy | 244/54 |
| 4,471,609 | 9/1984 | Porter et al. | 60/39.31 |

Primary Examiner—Joseph F. Peters, Jr.
Assistant Examiner—Jesus D. Sotelo
Attorney, Agent, or Firm—Christensen, O'Connor, Johnson & Kindness

[57] ABSTRACT

In an aircraft having a turbofan engine with a thrust reverser divided into two C-shaped cowl sections, a system for pivotally attaching each of the C-shaped cowl sections to the engine mounting strut for pivotal movement of the C-sections between a closed position adjacent the engine core and an open position spaced from the engine core, including first and second hinges cooperably attached to each half of the thrust reverser cowl and the engine mounting strut to define a hinge line associated with each cowl half. A third load transfer assembly is associated with each cowl half, each load transfer assembly having a first portion affixed to its associated engine cowl half and a second portion affixed to the engine mounting strut, both offset from the hinge line but within the contour of the engine cowl. The first and second portions engaging one another when the cowl half is in the closed position to act as a load transfer point for thrust loads to the engine mounting strut and disengaging when the cowl is in the open position. Preferably, the first portion is an arcuate slider block and the second portion is an arcuate channel that accepts the slider block when the cowl is in the closed position, both the arcuate slider block and the arcuate channel having their centers of curvature located on the hinge line.

11 Claims, 5 Drawing Figures

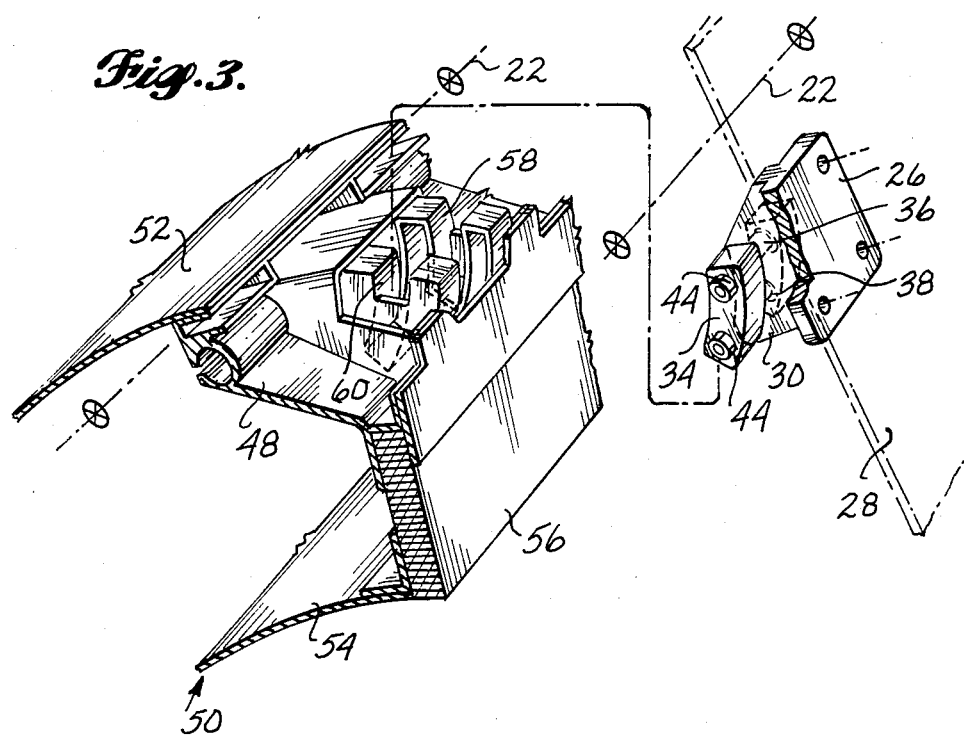
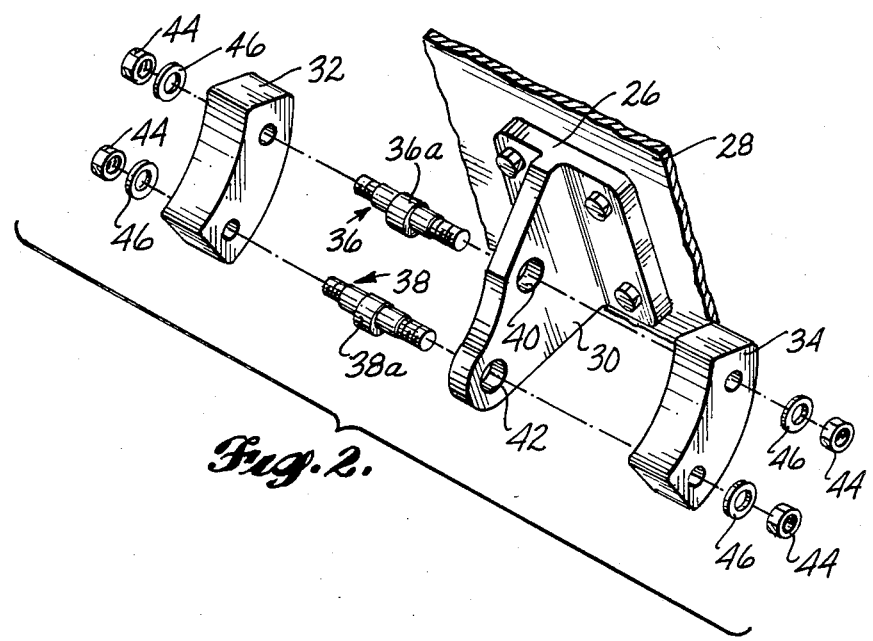

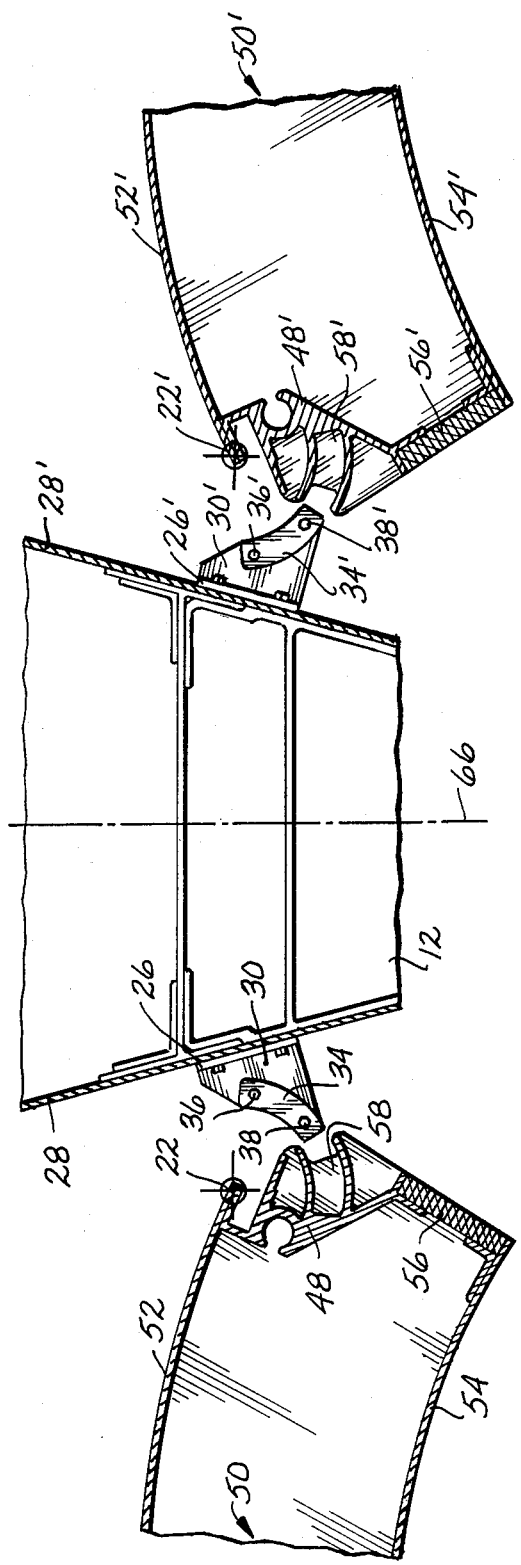

HINGE SYSTEM FOR THRUST REVERSER COWL

BACKGROUND OF THE INVENTION

This invention relates to a mounting system for hingedly mounting the halves of a thrust reverser cowl to an engine core, and more particularly relates to a system wherein two hinges are provided and an additional third load transfer means is provided to transfer the cowl loading to the engine mounting strut.

A typical thrust reverser structure for use with a turbofan engine consists of two semicircular duct halves, known as C-ducts, both hinged to the engine mounting strut so that the C-ducts can be pivoted to an open position spaced from the engine core for maintenance of the engine core and the thrust reverser itself. Each of the C-ducts pivots about a hinge line that is necessarily a straight line common to both the strut and the thrust reverser cowl. The cowl itself, however, is aerodynamically shaped and is narrower at the rear than at the front so that the hinge line is substantially outside the contour of the cowl at the rear portion of the thrust reverser cowling. Typically, three hinges are utilized to attach each C-duct to the engine mounting strut, with the third, or aft, hinge having to be specially arranged to operate on the hinge line outside the contour of the cowl. The cowl itself has to be modified by the addition of a fairing to cover the third hinge to reduce the aerodynamic drag of the hinge. The addition of the fairing adds significantly to the weight and peformance benefits of the aircraft. In some cases, the hinge line has been relocated downwardly to reduce the out-of-contour condition of the aft hinge. On some installations this is acceptable but adds significant weight penalties. On other installations strut construction dictates where the hinges must fall to optimize load path and the hinge line cannot be moved and, therefore, the addition of an aerodynamic fairing is unavoidable.

The most obvious solution to the problem of the third out-of-contour hinge is to simply eliminate the hinge. However, due to the enormous loads reacted into the strut from the reverser during flight conditions, it is necessary that there be at least three load transfer points to transfer the reverser load to the strut, and all reversers presently in service on commercial aircraft have at least three cowl hinges, and some more than three.

The third hinge is not needed to move the cowl into the open or maintenance position, nor is the third hinge needed to accommodate the load of the C-duct in the maintenance position when it is out of service. Therefore, in the maintenance and opening operations the third hinge could be completely eliminated. However, as discussed above, the third hinge is mandatory structurally to handle the load transfer from the thrust reverser to the engine mounting strut during operation of the aircraft.

SUMMARY OF THE INVENTION

In contemplation of the problems discussed above, the present invention provides a mounting system for each of the two halves, or C-ducts, that make up a thrust reverser cowl. For each C-duct the system includes two hinges cooperatively associated with the cowl half and engine strut to hingedly mount the thrust reverser C-duct to the strut for pivotal motion of the C-duct between its closed or operational position and its open or maintenance position. The first and second hinges define a hinge line and lie substantially within the contour of the cowl. In place of the usual third hinge a load transfer means is provided that includes a first portion mounted to the strut and a second portion mounted to the cowl. Both the first and second portions are displaced from the hinge line defined by the first and second hinges. The first and second portions cooperatively engage one another when the C-duct is in the operational position to assist in the transfer of loads from the cowl to the engine strut. When the C-duct moves to its open or maintenance position, the first and second portions disengage from one another. In a preferred embodiment the load transfer means includes a channel member affixed to the cowl and a slider member affixed to the strut, each of said members being arcuate in shape and having their center of curvature on said hinge line.

BRIEF DESCRIPTION OF THE DRAWINGS

The construction, operation and advantages of the present invention will be better understood by those of ordinary skill in the art and others upon reading the ensuing specification taken in conjunction with the attached drawings, wherein:

FIG. 2 is an isometric exploded view of one portion of a thrust reverser load transfer system made in accordance with the principles of the present invention.

FIG. 3 is an isometric view of the thrust reverser load transfer system of the present invention.

FIG. 5 is a cross-sectional view of the thrust reverser cowling of FIG. 4 in the maintenance position.

DETAILED DESCRIPTION OF THE PREFERRED EMBODIMENT

Figure 1:
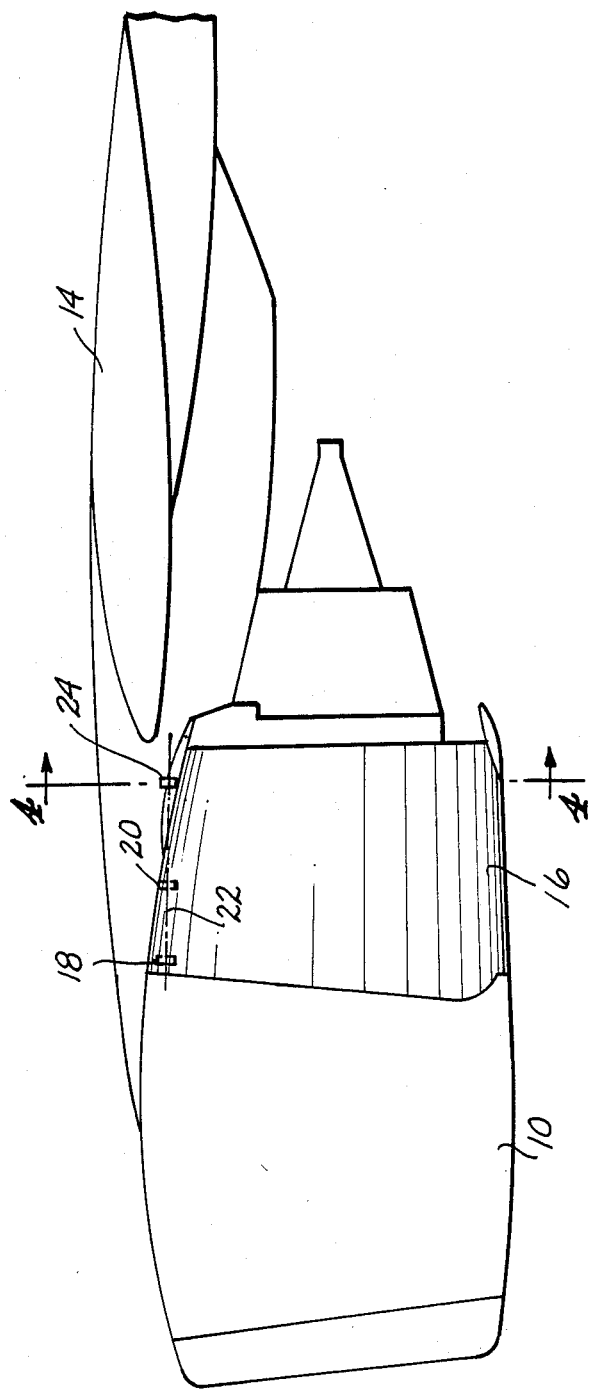
FIG. 1 is a side elevational view of a typical turbofan engine and associated thrust reverser mounted to the engine mounting strut of a commercial aircraft.

Referring to FIG. 1, a typical turbofan-type jet aircraft engine 10 is shown mounted to a strut 12, which in turn attaches the engine to the under surface of a wing 14 of an aircraft. The engine 10 includes a thrust reverser section including a cowl assembly 16 aft of the center of the engine. Typically, the thrust reverser 16 will include two halves of semicircular cross section, known as C-ducts, each half being hingedly attached to the engine mounting strut. The locations of the first and second hinges are shown by numerals 18 and 20. It can be seen that both hinge locations 18 and 20 lie within the contour of the thrust reverser cowl 16 and define a hinge line 22. An extension of the hinge line 22 aft shows that the location 24, at which a third hinge should be mounted, lies outside the contour of the cowl 16 and would require an additional aerodynamic fairing in order to reduce drag caused by such a third hinge. In the cowl mounting system of the present invention, the third hinge has been replaced by a load transfer assembly, that is better seen in FIGS. 2 through 5, that transfers the thrust reverser loads to the engine mounting strut in the same way that a hinge would, but is able to be mounted within the contour of the cowl 16, thereby eliminating the necessity for an additional aerodynamic fairing.

FIGS. 2 and 3 show in greater detail the mounting of the elements of one embodiment of a thrust reverser load transfer assembly made in accordance with the principles of the present invention. Referring to FIG. 2, a slider block mounting assembly includes a base plate 26 affixed to an outer skin 28 of the strut 12. Base plate 26 has a slider block mounting plate 30 integrally formed therewith and extending orthogonally from the base plate 26. First and second slider blocks 32 and 34 are mounted on either side of the mounting plate 30 by means of pins 36 and 38 that pass through holes formed in the slider blocks and the mounting plate. The slider blocks are preferably arcuate blocks of substantially rectangular cross section. The pins 36 and 38 are preferably eccentric pins. The central portions 36a and 38a each have an ellipsoidal cross section so that rotation of the pins in their associated circular holes 40 and 42 formed in the slider block mounting plate 30 will result in lateral movement of the slider blocks. This arrangement provides for position adjustment of the slider blocks 32 and 34 after assembly of the load transfer system. The pins 36 and 38 have fasteners such as nut and washer pairs 44 and 46 fastened to the ends thereof in a conventional manner to hold the slider blocks to the mounting plate 30.

The other portion of the load transfer assembly is a shoe assembly 48 that is mounted to the thrust reverser cowl. The slider blocks 32 and 34 cooperatively engage the shoe assembly 48 that is mounted to the cowl half 50. The cowl half 50 includes an outer skin 52 and an inner skin 54 of arcuate shape spaced from one another to form the double walled thrust reverser cowling. A honeycomb panel 56 extends radially from one end of the inner skin 54 and the shoe assembly 48 is attached between the honeycomb panel 56 and the outer skin 52 of the cowl 50. The shoe assembly 48 includes arcuate channels 58 and 60 which cooperatively receive the arcuate slider blocks 32 and 34, respectively, when the cowl 50 is in the closed or operational position covering the engine core (not shown).

Figure 4:
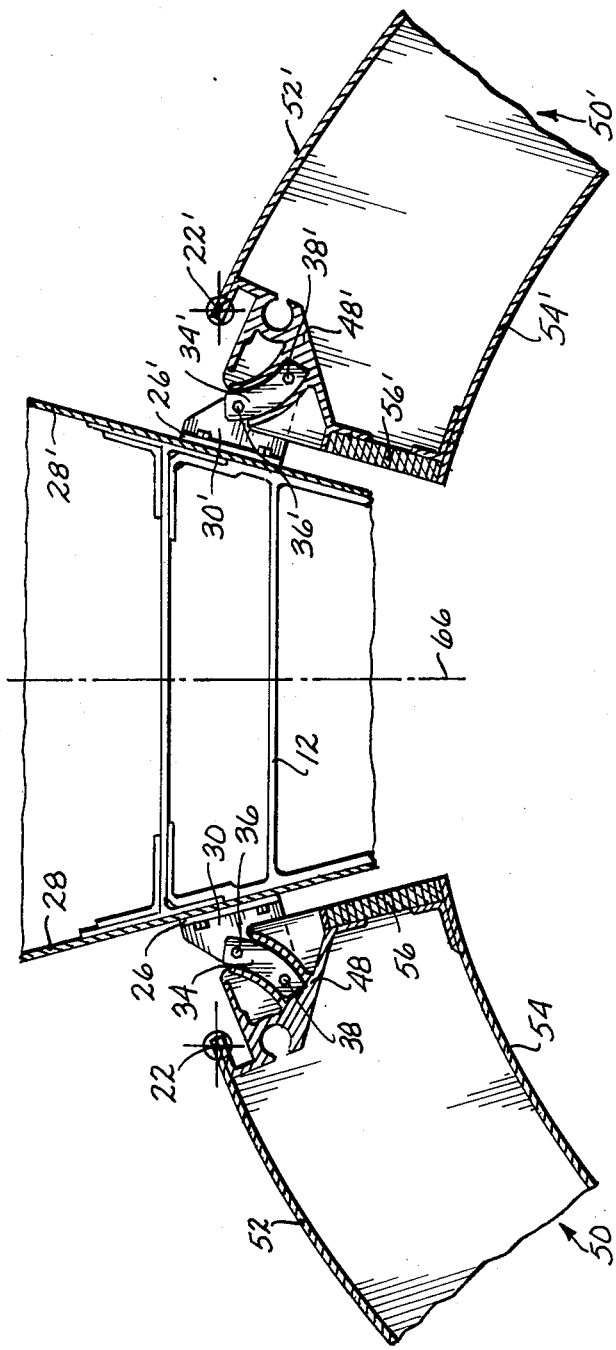
FIG. 4 is a cross-sectional view of a portion of the thrust reverser cowling of FIG. 1 in the operational position showing one embodiment of a load transfer system made in accordance with the principles of the present invention.

The interaction of the slider blocks 32 and 34 with the shoe assembly 48 can be best seen in FIGS. 4 and 5, which are cross-sectional views of the engine assembly shown in FIG. 1. FIG. 4 shows the cowl in its closed or operational position and FIG. 5 shows the cowl halves in the open or maintenance position. As can be seen from FIGS. 4 and 5, the strut 12 is symmetrical about the vertical centerline 66 and the cowl halves 50 and 50' are mirror images of one another. The working of the left-hand cowl half 50 and the load transfer assembly mounted thereto will be described with the understanding that the same reference numerals will be used on both right and left load transfer assemblies with the addition of primes to the reference numerals designating parts on the right side, as viewed in FIGS. 4 and 5. With reference to FIG. 4 it can be seen that when the cowl halves 50 and 50' are in their closed or operational position, the slider blocks 32, 34 and 32', 34' are engaged within the channels formed in shoe members 48 and 48'. Since a close fit is necessary in order to have proper load transfer from the thrust reverser cowl to the strut through the slider block and shoe assembly, the slider blocks 32 and 34 are mounted on eccentric pins 36 and 38 such that in initial installation the slider blocks are loosely attached to the mounting plate 30 and the cowl 50 placed in the closed position so that the slider blocks engage their respective channels in the shoe members. Once the slider blocks are engaged within the channels, the fasteners engaging the pins 36 and 38 are tightened so that the slider blocks are firmly held in the proper engagement position even after the cowls 50 and 50' are opened. The hinge line 22 and corresponding right-side hinge line 22' are illustrated in FIGS. 4 and 5, and it can be seen from the illustrations that the slider blocks and channels are offset from the hinge lines 22 and 22'. Preferably, the slider blocks and their respective channels are arcuate in shape and the centers of curvature of both the slider blocks and the channels are located on the hinge lines 22 and 22'.

The slider blocks closely fit into the channels in the shoe assembly in a transverse direction to provide sufficient bearing surface to handle the thrust reverser loads. However, there is a gap in the fore-aft direction between the slider blocks and the sides of the channel so that the reverser can move fore-aft with the engine while allowing the slider block and shoe assembly to maintain its load carrying function.

FIG. 5 shows the cowl halves 50 and 50' in their open or maintenance position, and it can be seen that as the cowls move to the maintenance position the shoe assemblies and their associated channels disengage from the slider blocks. In the maintenance position, the only load transfer points from the cowl halves to the strut 12 are through the conventional hinges at locations 18 and 20. The two hinges per cowl-half are satisfactory for the loads exerted by the cowl halves in the maintenance position since no undue loads except for the weight of the cowl halves need to be transferred to the strut.

As can be viewed in FIG. 5, the rotation of the cowl half 50 is about the hinge line 22 and is offset from the slider blocks and the channels. Preferably, the slider blocks are made of a suitable bearing-type material, such as an aluminum-nickel-bronze alloy. After repeated opening and closing of the cowls during the life of the aircraft, the slider blocks will wear but can be easily replaced. It can be seen from FIG. 4 that the slider block and channel, when in the closed position, lie well within the contour of the outer skin 52 and 52' of the cowl halves 50 and 50' so that there is no need for an additional aerodynamic fairing to accommodate what would otherwise be a third hinge in the hinge system attaching the cowl halves to the strut. It can also be seen from FIG. 4 that there is a direct load path from the cowl halves 50 and 50' to the strut 12 through the load transfer assembly when the cowls are in their closed position, so that the effect is the same from a load transfer standpoint as having three hinges, even though the load transfer assembly of the present invention is not in and of itself a true hinge.

In summary, therefore, a system for mounting the C-duct halves of a thrust reverser cowl to an engine mounting strut is provided. The system operates to transfer thrust reverser loads to the strut during operation of the aircraft with the cowls in the closed position and also allows the cowl halves to be pivoted to an open or maintenance position. The mounting system includes first and second conventional hinges associated with each cowl half and the strut and a load transfer means associated with each cowl half and the strut. Each load transfer means has first and second portions that engage one another when its associated cowl half is in the closed position. The first and second portions disengage from one another when the cowl halves are in the open position. The first and second portions operate about the hinge line defined by the first and second hinges but are offset from the hinge line so that they can be contained within the contour of the cowl. It will be understood by those of ordinary skill in the art and others that, while a preferred embodiment of the present invention has been described and illustrated herein, several changes can be made to the illustrated embodiment while remaining within the spirit and scope of the present invention. Therefore, the present invention should be defined solely with reference to the appended claims.

The embodiments of the invention in which an exclusive property or privilege is claimed are defined as follows:

1. In an aircraft having at least one engine mounted on an engine mounting strut, said engine including a thrust reverser cowl, said cowl being divided into two cowl halves, a mounting system for pivotally attaching said cowl halves to said engine mounting strut for movement of said cowl halves between a closed position in which said cowl halves envelop said engine and an open position in which said cowl halves are spaced from said engine, said mounting system including:
    first and second hinge cooperatively mounted on said cowl and said strut, said first and second hinges defining a hinge line;
    load transfer means cooperatively mounted on said strut and at least one of said cowl halves offset from said hinge line, said load transfer means including a first portion mounted on said cowl half and a second portion affixed to said strut, said first and second portions being in cooperative engagement when said cowl half is in its closed position for bearing a portion of the load of said cowl and disengaged when said cowl is in the open position.

2. The system of claim 1 wherein a second load transfer means is mounted to said strut and the other of said cowl halves, said second load transfer means including a first portion mounted on said other cowl half offset from said hinge line and a second portion mounted on said strut, said first and second portions cooperatively engaging one another when said other cowl half is in the closed position for bearing a portion of the load of said cowl and disengaging from one another when said other cowl half moves to its open position.

3. In an aircraft having at least one engine mounted on an engine mounting strut, said engine including a thrust reverser cowl, said cowl being divided into two cowl halves, a mounting system for pivotally attaching said cowl halves to said engine mounting strut for movement of said cowl halves between a closed position in which said cowl halves envelop said engine and an open position in which said cowl halves are spaced from said engine, said mounting system including:
    first and second hinges cooperatively mounted on said cowl and said strut, said first and second hinges defining a hinge line;
    load transfer means cooperatively mounted on said strut and at least one of said cowl halves offset from said hinge line, said load transfer means including a first portion mounted on said cowl half and a second portion affixed to said strut, said first and second portions being in cooperative engagement when said cowl half is in its closed position and disengaged when said cowl is in its open position, said first portion including a first channel and said second portion including a first slider block affixed to said strut, said channel and said block being cooperatively shaped to easily engage and disengage as the cowl half moves between the open and closed positions.

4. The system of claim 3 wherein:
    said first portion moves in a circular path as said cowl half moves to its open position, said circular path having its center on said hinge line.

5. The system of claim 3 wherein said slider block and said channel are arcuate and the center of curvature of both said channel and said slider block lies on said hinge line.

6. The system of claim 3 wherein said first portion has a second channel formed therein and said second portion includes a second slider block cooperable with said second channel to engage said second channel when said cowl is in the closed position.

7. The system of claim 6 wherein said second channel and said second slider block are arcuate and the center of curvature of said second slider block and second channel lie on said hinge line.

8. The system of claim 3 wherein the width of said slider block is smaller than the width of said channel in a direction parallel to a fore-aft axis of said engine.

9. The system of claim 3 wherein said second portion includes a baseplate affixed to said strut, a slider block mounting plate extending orthogonally from said baseplate, said slider block mounting plate having apertures formed therein and said slider block having apertures formed therein aligned with said apertures in said mounting plate, said system further including at least one pin passing through said apertures in said slider block and said mounting plate and fastening means cooperatively engaging said pin to fasten said slider block to said mounting plate.

10. The system of claim 9 wherein a portion of said pin that engages said aperture in said mounting plate is of eccentric cross section.

11. The system of claim 9 further including a second slider block adjacent said mounting plate such that said mounting plate lies between said first and second slider blocks, said second slider block being attached to said mounting plate by said at least one pin.

* * * * *